United States Patent Office 3,461,040
Patented Aug. 12, 1969

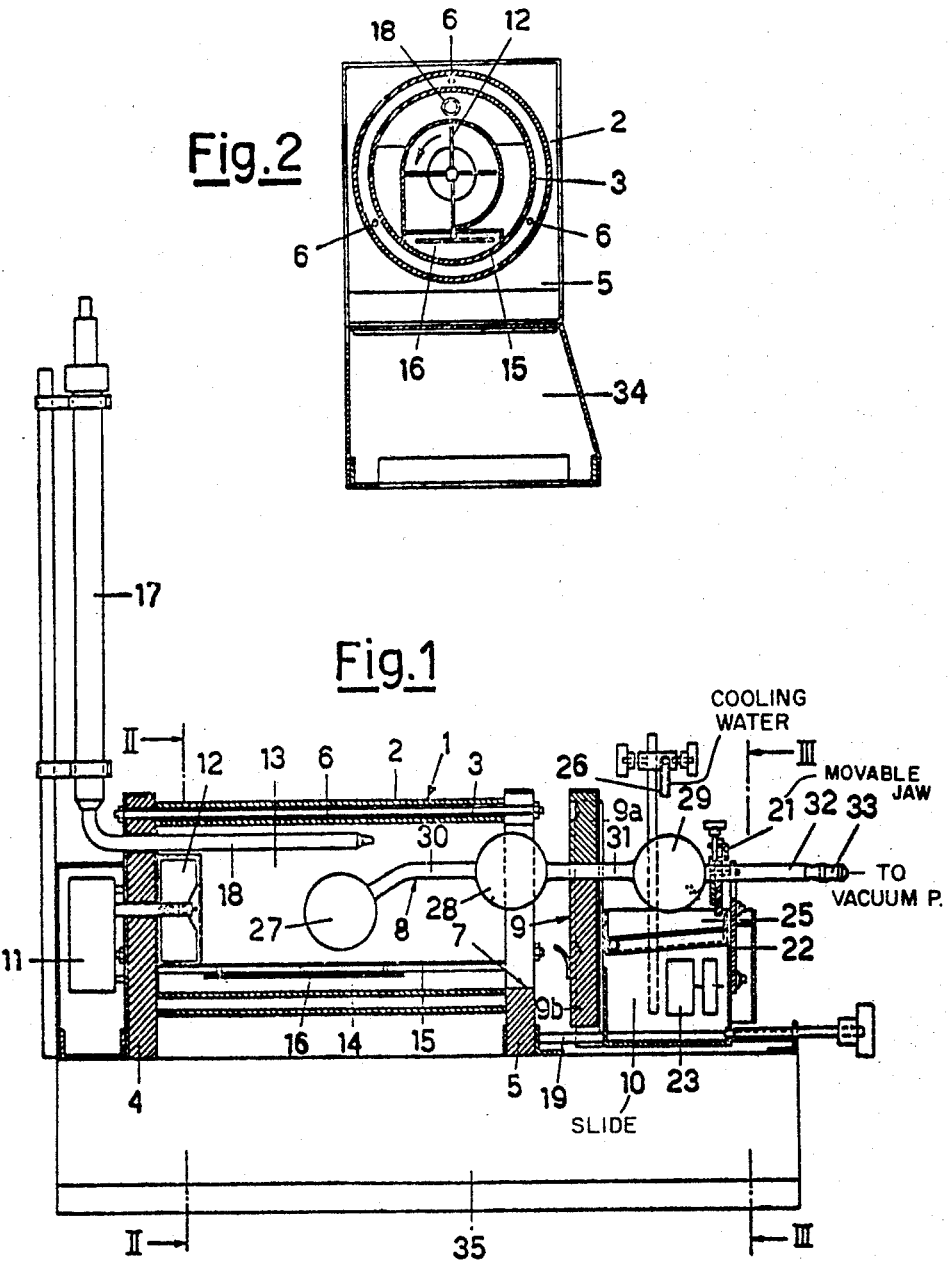

3,461,040
APPARATUS FOR AUTOMATIC REDUCED PRESSURE SEMI-MICRO DISTILLATION OF LIQUID DECOMPOSING AT BOILING POINT UNDER ATMOSPHERIC PRESSURE
Mario Borbonese, Angelo De Ros and Giorgio Pifferi, Milan, Italy, assignors to Lepetit S.p.A., Milan, Italy
Filed Mar. 27, 1967, Ser. No. 626,304
Claims priority, application Italy, Mar. 29, 1966, 16,136/66
Int. Cl. B01d 3/14, 3/10, 3/08
U.S. Cl. 202—238                         11 Claims

ABSTRACT OF THE DISCLOSURE

An apparatus is described for automatic semi-micro vacuum distillation of small quantities of liquids, particularly suitable in the case of substances which decompose if evaporated under atmospheric pressure. The apparatus comprises three spherical bulbs slidably supported as a unit on a horizontal axis, the bulbs being in series communication with the innermost end bulb adapted to contain the distilland, the other bulbs receiving distillate fractions.

---

Figure 3:
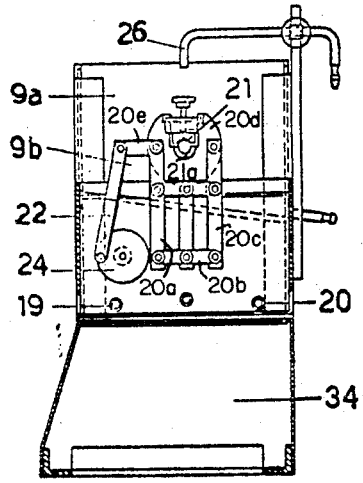

The aim of the present invention is an apparatus for automatic reduced pressure semi-micro distillation of liquids decomposing at boiling point under atmospheric pressure. Vacuum distillation is mainly used in chemical laboratories for the separation and purification of liquid compounds which, at a boiling point corresponding to the atmospheric pressure, show signs of decomposition.

The aim of the invention is mainly that of achieving an apparatus comprising those essential parts for carrying out distillation under reduced pressure, and capable of performing automatically, under control, the operations during distillation, thus limiting the operator's intervention to the utmost.

The apparatus according to the invention substantially consists of an oven, which can be opened, into which a glass container consisting of several communicating bulbs is partially introduced, said container being connected to a vacuum pump, together with means for bringing the inside of the oven to a variable preset temperature, and for maintaining this temperature unchanged within narrow limits, as well as electromechanical means for imparting to said container an oscillating movement during distillation.

The oven is preferably built with double glass walls which, ensuring good heat insulation, permit observation of the bulb container from the outside.

The oven is advantageously heated by means of electrical resistances so that the temperature can be varied continuously up to a maximum value, for instance, of 300° C.

Maintenance of the temperature inside the oven is controlled by a switch, and a closed cycle forced air circulation is provided to ensure uniformity of the temperature.

The glass container consists, for instance, of three communicating spherical bulbs, the first two of which are on the same axis, while the terminal bulb, which receives the liquid for distillation, is placed somewhat lower, in order to avoid the liquid pouring into the other two bulbs which receive and collect the fractions of the distillate. The terminal bulb is always introduced into the oven, while the intermediate bulb may be placed inside or outside the oven according as to whether one or two fractions are to be collected.

The glass container is made to oscillate around the axis of the two aligned bulbs for an amplitude, for example, of 80°, and with a frequency, for instance, of 40 oscillations per minute. This movement serves to increase the evaporation surface of the liquid for distillation present in the terminal bulb, thus making distillation more rapid. Moreover, the possibility of turbulent distillation is greatly reduced, avoiding the danger of spilling of the liquid into the middle bulb. In these conditions the passage of the liquid from one bulb to the next occurs according to the principle of laminar layer evaporation. The bulb or bulbs remaining outside the oven are cooled under a jet of water. The glass container is connected to the vacuum pump by means of a rubber or plastic connection.

The term "semi-micro distillation," as used herein, has reference to the vacuum distillation of quantities of distilland of the order of 0.2 to 10 g.

Figure 4:
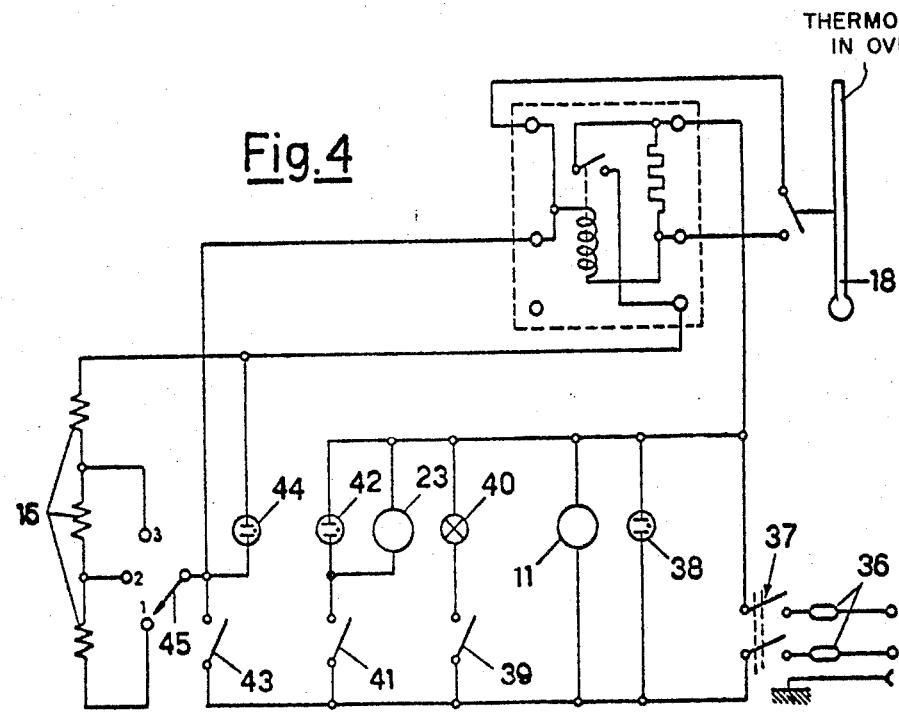

The apparatus according to the invention will be later described in detail in a form given merely as an example, and not to be considered limiting, and illustrated in the attached drawings, in which:

FIGURE 1 schematically shows the apparatus in longitudinal axial section;
FIGURES 2 and 3 are cross-sections along lines II—II and III—III respectively of FIGURE 1, and
FIGURE 4 is the wiring diagram.

Oven 1 consists of two cylinders 2 and 3 of heat-resistant glass assembled co-axially so as to provide an air-gap for insulation purposes. The two cylinders 2 and 3 are maintained in position by the two flanges 4 and 5 of insulating material, fixed by three tie-rods 6 passing through the air-gap between the two cylinders. Flange 4 at the left of FIGURE 1 completely closes the oven, while that at the right in FIGURE 1 (No. 5), is pierced by hole 7, equal in diameter to that of the smaller cylinder 3, permitting introduction of the glass container 8. A lamp (not illustrated) assembled on the outside of the oven, can be switched on to facilitate observation during distillation.

The heat-regulating device comprises also an asynchronous motor 11 assembled externally of the oven on flange 4 and operating a centrifugal fan 12 inside the oven. The fan, with a delivery of approximately 1 litre/sec., sucks the air from the distillation chamber 13 and conveys it into a duct 14 formed in the lower part of the oven by means of a shelf 15. A mica support and three electrical resistances are arranged in duct 14; said resistances can be connected through a suitable switch in such a way as to absorb various electrical ratings corresponding to temperatures which can be reached inside the oven, for example, of 300° C., 250° C. and 150° C. Adjustment and reading of the temperature is carried out by means of a regulating thermometer or thermostat 17, whose bulb 18 is inside the oven, in the distillation chamber 13. In order to obtain the required temperature, the temperature setting member (not shown) of the thermostat 17 is brought to the required value and then resistances 16 are switched on. At that moment the temperature starts to rise, and at the exact moment when the set value is reached, the thermoregulator cuts off the current to the resistances. When the temperature falls the resistances are again supplied with current, and the cycle is repeated. Two cylindrical guides 19 and 20 are assembled in front of the oven opening, on which runs slide 10 which, on the side turned towards the opening of oven 1, consists of a panel of insulating material 9 divided into two sections: the upper section 9a is movable and can be separated from the lower section 9b on which it rests. The lower section 9b serves as a support, through the suitable housing, of the bulb container 8. The parts of the panel form a surface which, when slide 10 is close up to opening 7 of oven 1, acts as a closure. The second supporting point of the glass container 8 consists of a screw-operated vertical movable jaw 21 assembled at the centre of one of the sides 20d of an oscillating parallelogram 20a, 20b, 20c, 20d; (FIG. 3) which receives the movement through a connection rod 22 and an eccentric 24 operated by an electric motor 23 with reducing gears, the rod 22 being pivoted to an angular extension of the link 20a of the parallelogram. The jaw 21 cooperates with the jaw 21a in the member 20d of the parallelogram structure and together they transmit the movement to the glass container 8, the jaws being set at a distance from panel 9 and the resulting space contains a small bath 25 complete with drainage opening, its purpose being to collect the cooling water which is allowed to run over the surface of the bulb in which the distillate is collected. The water comes from a nozzle 26 which is arranged vertically above the bulb at a certain distance from same, after connecting it to any kind of water supply.

The glass container 8 comprises three spherical bulbs 27, 28 and 29; the terminal bulb 27 into which the liquid for distillation is introduced, is connected to the second, 28, by means of glass tube 30, which is bent at an angle of approximately 150°; the second bulb 28 is connected to the first bulb 29 through a straight tube 31. A tube 32 continues from the first bulb 29, along the same axis as the previous tube, and at its end is shaped to take a rubber tube 33. The diameter of the bulbs may vary at will, as long as the distance between them is kept constant.

The base 34 of the apparatus consists of metal sheeting in the form of a trapezoid in vertical section, and the electrical circuit controls are arranged on the front panel 35 (illustrated in FIGURE 4 of the drawing) in the following order, from right to left in FIGURE 4: two protective fuses 36, switch 37, fan control with spy-lamp 38, switch 39 for lighting (lamp 40), switch 41 controlling the shaking with spy-lamp 42, switch 43, heating switch with spy-lamp 44, three-way switch 45 for varying the heating power.

The operation of the apparatus described is briefly as follows:

The liquid for distillation is introduced into the terminal bulb 27 of container 8 and the container itself is fixed on the two supports in such a position that by moving slide 10 to the left (in FIGURE 1), to close oven 1, the third and the second bulbs, 27 and 28 respectively, are positioned inside the oven itself. The first bulb 29 situated outside oven 1 is cooled with a jet of water. Container 8 is connected to the vacuum pump (not illustrated) by means of a rubber tube.

After reaching the minimum pressure at room temperature, oven 1 is heated until the conditions for efficient evaporation are reached. At this point the condensation of the first fraction of distillate in the condensing bulb 29 situated outside the oven is observed. In the case of a mixture of two liquids with different vapour tensions, when the first fraction has been collected the middle bulb 28 of container 8 is brought outside oven 1 to receive the second fraction of distillate. The portion of lowest vapour tension remains in the terminal bulb 27 when distillation is complete.

Oven 1 may be brought to a maximum temperature, for instance 300° C., and the temperature regulating device limits temperature oscillations to ±0.2° C. in the distillation chamber 13. These performances are obtained by means of the self-regulating heater with closed cycle forced air circulation.

The following table gives some examples of distillation of various substances: the distillation times have been obtained for 10 g. of substance and do not include the time necessary for bringing the liquid to the vaporisation temperature.

TABLE

| Substance | ° C. in oven | Pressure (mm. Hg) | Minutes |
| --- | --- | --- | --- |
| Butyl alcohol | 75 | 80 | 45 |
| Nitrobenzene | 120 | 40 | 35 |
| Diethylphthalate | 150 | 10 | 20 |
| Xylol | 80 | 10 | 10 |
| $\alpha$-Phenyl-$\alpha$-ethyl-$\beta$-amino propionate ethyl | 135 | 1.8 | 22 |
| 3,8-dibenzyl-diazabicyclo-(3,2,1)-octane-2,4-dione (M.P. 48° C.) | 210 | 0.3 | 25 |

As a result from the previous description with the apparatus according to the invention, the operator's intervention is limited to introduction of the liquid into the container, introduction of the latter into the oven, switching on the shaking mechanism, setting the temperature, and finally, collecting the distillate.

We claim:

1. An evaporator for automatic semi-micro distillation of liquids, decomposing when boiling at atmospheric pressure, comprising a glass container, consisting of at least three spherical bulbs in series communication, assembled about a substantially horizontal axis, except for the terminal bulb, which forms a closure for one end of the container, and intended to receive the distilland which is positioned at an angle to said axis, the other bulbs being in their turn intended to receive the distilled fractions, and wherein the other end of the container is open for connection with a vacuum pump, heating means comprising an electrically heated oven, panel means for supporting the container movable horizontally along the container axis in order to position the bulbs with respect to the oven, and means for oscillating the container about its axis.

2. An evaporator according to claim 1, wherein the means for oscillating the container comprises an oscillating parallelogram structure actuated by an electric motor through a connecting rod and eccentric.

3. Apparatus according to claim 1, characterized by the fact that the oven is built with cylindrical glass double walls and is closed at one end by a fixed wall, while the other end is closed by a movable wall divided in two sections, supporting the bulb container inside the oven, as it is divided longitudinally by a horizontal shelf into an upper chamber for holding said container and a lower duct housing the electrical heating resistances, said duct and said chamber intercommunicating at the part of the oven closed by the fixed wall, by means of a fan aspirating air from said chamber and channelling it into said duct from which it then passes in closed circle to said chamber through an opening arranged in said shelf at the opposite end of the oven.

4. Apparatus according to claim 3, characterized by the fact that the electrical resistances are connected to the main supply through a commutator by means of which it is possible to insert at will one or more of said resistances and vary the temperature required in the oven.

5. Apparatus according to claim 3, characterized by the fact that in the chamber of the oven into which is introduced the container holding the liquid for distillation a thermoregulator bulb acts on the electrical resistances which keeps the oven temperature at a constant value.

6. An evaporator according to claim 1, characterized by the fact that the bulbs are equally spaced horizontally along the connecting tube.

7. An evaporator according to claim 1, characterized by the fact that the glass container is supported on one side by the wall in two sections suitable for closing the oven, and on the other by a screw-operated jaw assembled at the centre of one of the sides of an oscillating parallelogram.

8. Apparatus according to claim 7, characterized by the fact that the bulb container, its supports and the device for inducing oscillation of the container are assembled on a slide which can be moved along an axis parallel to the oven axis, in prolongation of same at its open side.

9. Apparatus according to claim 8, characterized by the fact that the oven and said slide are assembled on a base containing the electrical circuits.

10. Apparatus according to claim 9, characterized by the fact that said slide bears, between the two container supports, a bath with drainage outlet arranged below the distillate collecting flask, while a nozzle, for connection to the water supply, is arranged above said bulb.

11. Apparatus according to claim 9, characterized by the fact that the switches controlling the electrical circuits, the protective fuses and the pilot lamps are arranged on the front panel of the base.

References Cited

UNITED STATES PATENTS

| | | | |
|---|---|---|---|
| 440,752 | 11/1890 | Barotte | 202—205 X |
| 1,835,024 | 12/1931 | Driggs | 23—292 X |
| 2,180,050 | 11/1939 | Hickman | 202—205 |
| 2,419,042 | 4/1947 | Todd | 202—205 |
| 2,695,871 | 11/1954 | Shavel et al. | 202—205 X |
| 2,785,064 | 3/1957 | Wilhelm | 23—292 X |
| 2,865,445 | 12/1958 | Buchler | 159—23 |
| 3,342,696 | 9/1967 | Bush | 23—292 X |

FOREIGN PATENTS

| | | |
|---|---|---|
| 513,564 | 6/1955 | Canada. |

NORMAN YUDKOFF, Primary Examiner

F. E. DRUMMOND, Assistant Examiner

U.S. Cl. X.R.

23—292; 196—112; 202—173, 205; 203—87